(12) United States Patent
Mupkala et al.

(10) Patent No.: US 10,839,446 B1
(45) Date of Patent: Nov. 17, 2020

(54) SYSTEMS AND METHODS FOR RECOMMENDING PERSONALIZED REWARDS BASED ON CUSTOMER PROFILES AND CUSTOMER PREFERENCES

(71) Applicant: Capital One Services, LLC, McLean, VA (US)

(72) Inventors: Ravi Mupkala, Aldie, VA (US); Mackenzie Sweeney, Bristow, VA (US); Devaiah Bachamada, Leesburg, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/545,999

(22) Filed: Aug. 20, 2019

(51) Int. Cl.
  *G06Q 30/06* (2012.01)
  *G06N 20/00* (2019.01)
  *G06Q 30/02* (2012.01)

(52) U.S. Cl.
  CPC ......... *G06Q 30/0631* (2013.01); *G06N 20/00* (2019.01); *G06Q 30/0224* (2013.01); *G06Q 30/0239* (2013.01); *G06Q 30/0633* (2013.01)

(58) Field of Classification Search
  CPC .......... G06Q 30/0631; G06Q 30/0224; G06Q 30/0239; G06Q 30/0633; G06N 20/00
  USPC ..................................... 705/14.17
  See application file for complete search history.

(56) References Cited

U.S. PATENT DOCUMENTS

| | | |
|---|---|---|
| 6,853,982 B2 | 2/2005 | Smith et al. |
| 2002/0010625 A1* | 1/2002 | Smith ................ G06Q 30/0253 705/14.52 |
| 2011/0218884 A1* | 9/2011 | Kothari ................. G06Q 30/02 705/27.1 |

FOREIGN PATENT DOCUMENTS

WO   WO -0175760 A1 * 10/2001 ............. G06Q 40/08

OTHER PUBLICATIONS

J. Ben Schafer, Joseph A. Konstan, John Riedl, 2011, E-Commerce Recommendation Applications (Year: 2011).*

* cited by examiner

*Primary Examiner* — Tarek Elchanti
(74) *Attorney, Agent, or Firm* — Pillsbury Winthrop Shaw Pittman LLP

(57) ABSTRACT

A system for recommending personalized rewards based on customer profiles and customer preferences includes one or more processors configured to access customer parameters associated with the first customer and customer parameters associated with a plurality of second customers from a database. The values of customer parameters of the first customer are compared with the values of the customer parameters of the plurality of second customers to identify of the plurality of second customers having customer parameter values that correspond to the customer parameter values associated with the first customer. A list of reward purchase categories is determined based on analyzing customer profiles associated with the identified plurality of second customers. Personalized rewards associated with the selected one or more reward categories are transmitted to the user device associated with the first customer, the personalized rewards to accrue based on consumer purchase transactions by the first customer.

20 Claims, 10 Drawing Sheets

Table 1

| Reward Categories | Customer 114(2) | Customer 114(3) | Customer 114(4) |
|---|---|---|---|
| Travel rewards | No | Yes | No |
| Gas rewards | Yes | Yes | Yes |
| Grocery rewards | Yes | No | Yes |
| Cashback rewards | No | No | No |
| Gift Card rewards | Yes | No | Yes |

FIG. 7A

| Table 2: Ranked list of reward categories |||
|---|---|---|
| Rank | Ranked Reward Category | Reward Values |
| 1 | Gas rewards | Discount of 50c/per gallon |
| 2 | Grocery rewards | Discount of 20% on grocery purchases |
| 3 | Gift Card rewards | $50 gift card |
| 4 | Travel rewards | Receive 50 miles on purchases of $1000 |
| 5 | Cashback rewards | 10% cashback on all purchases |

FIG. 7B

SYSTEMS AND METHODS FOR RECOMMENDING PERSONALIZED REWARDS BASED ON CUSTOMER PROFILES AND CUSTOMER PREFERENCES

TECHNICAL FIELD

Embodiments of the present disclosure relate to systems and methods for recommending personalized rewards based on customer profiles and customer preferences. More particularly, embodiments of the present disclosure relate to utilizing customer financial information, to recommend personalized reward categories and rewards associated with the recommended personalized reward categories to a user device.

BACKGROUND

Users (e.g., online customers) often use credit cards that are enrolled in a program to reward the customer with a reward (e.g. travel reward) based on the amount of money spent by the customer by utilizing the credit card. By way of example, for every $1000 spent by the customer, the customer receives $10 that can be spent only on travel bookings (e.g., purchase of a flight ticket). In a case where a customer does not wish to travel has a lifestyle that does not permit him/her to travel the customer may prefer not to receive travel rewards. Instead, the customer may prefer receiving, e.g., grocery rewards, gas rewards or a combination of grocery rewards and gas rewards, because the customer feels that receiving these rewards would be more beneficial for them as compared to travel rewards.

SUMMARY

In accordance with embodiments of the present disclosure, there is provided a system for recommending personalized rewards based on customer profiles and customer preferences, the system comprising: one or more memory devices storing instructions; and one or more processors configured to execute the instructions to: receive, from a user device associated with a first customer, a request for initiating recommendation of personalized rewards; access values of one or more customer parameters associated with the first customer from a database; access values of the one or more customer parameters associated with a plurality of second customers from the database; compare the values of the one or more customer parameters of the first customer with the values of the one or more customer parameters of the plurality of second customers to identify one or more of the plurality of second customers having customer parameter values that correspond to one or more of the customer parameter values associated with the first customer; analyze customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions; transmit a first recommendation to the user device associated with the first customer, the first recommendation comprising the list of reward purchase categories determined based on the analyzing; receive a selection by the first customer of one or more reward categories from the recommended list of reward categories; and transmit a second recommendation to the user device associated with the first customer, the second recommendation comprising personalized rewards associated with the selected one or more reward categories, the personalized rewards to accrue based on consumer purchase transactions by the first customer.

In accordance with embodiments of the present disclosure, there is also provided a computer implemented method for recommending personalized rewards based on customer profiles and customer preferences, the method comprising: receiving, from a user device associated with a first customer, a request for initiating recommendation of personalized rewards; accessing values of one or more customer parameters associated with the first customer from a database; accessing values of the one or more customer parameters associated with a plurality of second customers from the database; comparing the values of the one or more customer parameters of the first customer with the values of the one or more customer parameters of the plurality of second customers to identify one or more of the plurality of second customers having customer parameter values that correspond to one or more of the customer parameter values associated with the first customer; analyzing customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions; transmitting a first recommendation to the user device associated with the first customer, the first recommendation comprising the list of reward purchase categories determined based on the analyzing; receiving a selection by the first customer of one or more reward categories from the recommended list of reward categories; and transmitting a second recommendation to the user device associated with the first customer, the second recommendation comprising personalized rewards associated with the selected one or more reward categories, the personalized rewards to accrue based on consumer purchase transactions by the first customer.

In accordance with embodiments of the present disclosure, there is further provided a non-transitory computer-readable medium storing instructions executable by one or more processors to perform operations for recommending personalized rewards based on customer profiles and customer preferences, the operations comprising: receiving, from a user device associated with a first customer, a request for initiating recommendation of personalized rewards; accessing values of one or more customer parameters associated with the first customer from a database; accessing values of the one or more customer parameters associated with a plurality of second customers from the database; comparing the values of the one or more customer parameters of the first customer with the values of the one or more customer parameters of the plurality of second customers to identify one or more of the plurality of second customers having customer parameter values that correspond to one or more of the customer parameter values associated with the first customer; analyzing customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions; transmitting a first recommendation to the user device associated with the first customer, the first recommendation comprising the list of reward purchase categories determined based on the analyzing; receiving a selection by the first customer of one or more reward categories from the recommended list of reward categories; and transmitting a second recommendation to the user device associated with the first customer, the second recommendation comprising personalized rewards associated with the selected one or more reward categories, the personalized rewards to accrue based on consumer purchase transactions by the first customer.

BRIEF DESCRIPTION OF DRAWINGS

The accompanying drawings, which are incorporated in and constitute a part of his specification, illustrate disclosed embodiments and, together with the description, serve to explain the disclosed embodiments. In the drawings:

FIG. 7A contains a table for redeemable reward categories associated with customers, and FIG. 7B contains a table of ranked redeemable reward categories.

DETAILED DESCRIPTION

Figure 1:
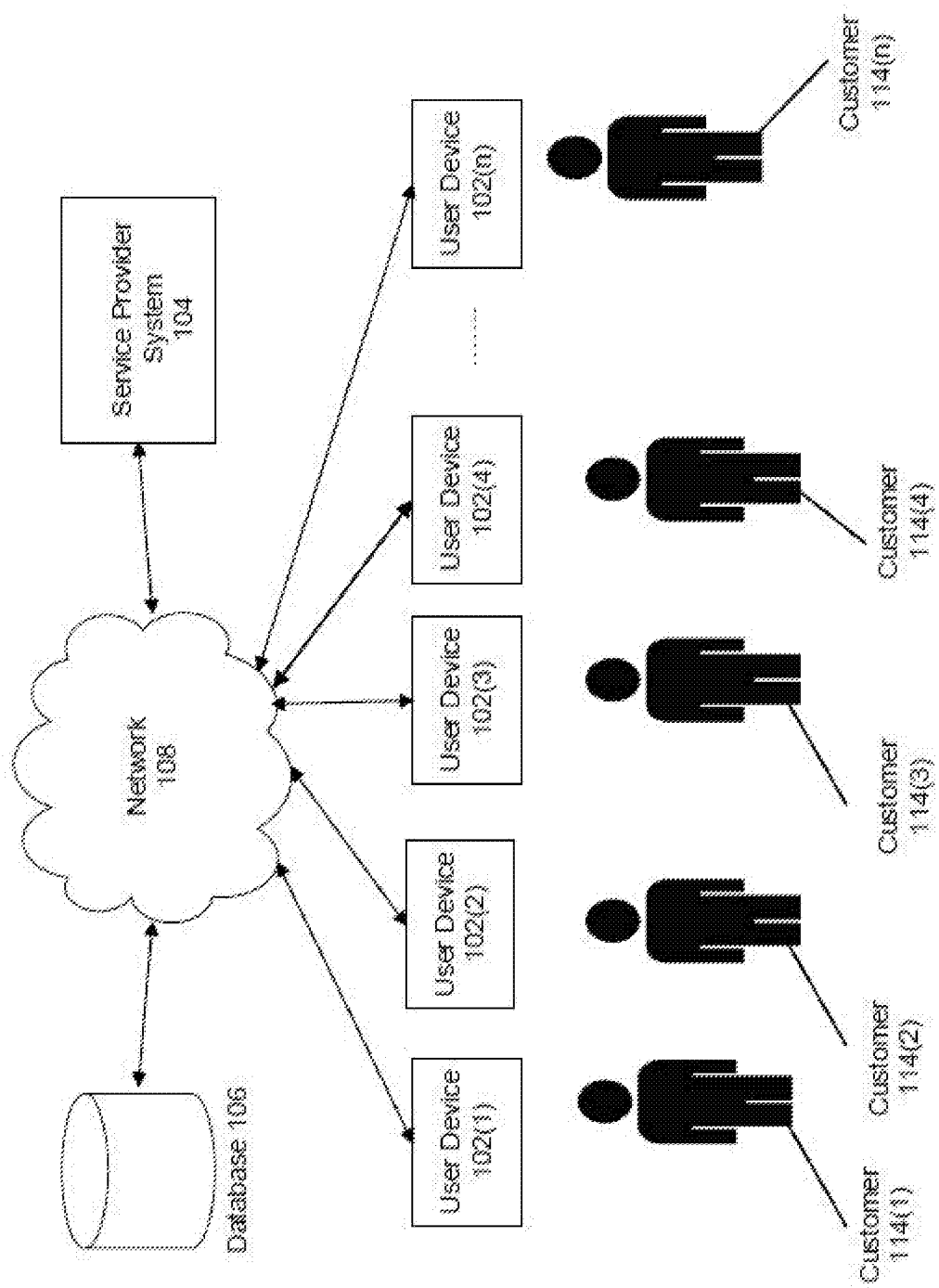
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

An initial overview of machine learning and prediction is first provided immediately below and then specific exemplary embodiments of systems, methods, and devices for recommending personalized rewards based on customer profiles and customer preferences are described in further detail. The initial overview is intended to aid in understanding some of the technology relevant to the systems, methods, and devices disclosed herein, but it is not intended to limit the scope of the claimed subject matter.

In the field of machine prediction, there are two subfields: knowledge-based systems and machine-learning systems. Knowledge-based systems rely on the creation of a heuristic or rule-based system which is then applied to a particular problem or dataset. Knowledge based systems make inferences or decisions based on an explicit "if-then" rule system. Such systems rely on extracting a high degree of knowledge about a limited category with a goal of providing all possible solutions to a given problem. These solutions are then embodied in a series of instructions to be sequentially followed by a machine.

Machine learning systems, unlike knowledge-based systems, provide machines with the ability to learn through data input without being explicitly programmed with rules. For example, conventional knowledge-based system programming relies on writing algorithms (i.e., rules) and programming instructions to execute each algorithm. Machine learning systems, on the other hand, make data-driven decisions to construct their own rules. The nature of machine learning is the iterative process of using rules, and creating new ones, to identify unknown relationships to better generalize and handle non-linear problems with incomplete input data sets. A detailed explanation of one exemplary machine learning technique is disclosed in the article: Michalski, R. S., Stepp, R. E. "Learning from Observation: Conceptual Clustering," Chapter 11 of Machine Learning: An Artificial Intelligence Approach, eds. R. S. Michalski, J. G. Carbonell and T. M. Mitchell, San Mateo: Morgan Kaufmann, 1983 which is incorporate herein by reference. Embodiments of the present disclosure implement a recommendation model which uses machine learning.

While the following description is directed to recommending personalized rewards based on customer profiles and customer preferences, are made by example only. It should be appreciated that the present disclosure is not limited to the specific disclosed embodiments and details, which are exemplary only. It is further understood that one possessing ordinary skill in the art, in light of known systems and methods, would appreciate the use of the embodiments of the present disclosure for their intended purposes and benefits in any number of alternative embodiments, depending on specific design and other needs.

FIG. 1 is a block diagram of an exemplary system 100, for performing one or more operations consistent with disclosed embodiments. In some embodiments, system 100 includes one or more user devices 102(1), 102(2), . . . 102(n), one or more service provider systems 104, one or more databases 106, and a network 112. The components and arrangement of the components included in system 100 may vary. Thus, system 100 may include other components that perform or assist in the performance of one or more operations consistent with the disclosed embodiments.

As more fully described below, user devices 102(1)-102(n) and service provider system 104 may include one or more computing devices (e.g., computer(s), server(s), etc.), memory storing data and/or software instructions (e.g., database(s), memory devices, etc.), and other known computing components. In some embodiments, the one or more computing devices may be configured to execute software instructions stored in the memory to perform one or more operations consistent with the disclosed embodiments. Aspects of service provider system(s) 104, database(s) 106, and user devices 102(1)-102(n) may be configured to communicate with one or more other components of system 100 via network 108, for example. In certain aspects, customers 114(1)-114(n) are respectively associated with and operate user devices 102(1)-102(n), to interact with one or more components of system 100 by sending and receiving communications, initiating operations, and/or providing input for one or more operations consistent with the disclosed embodiments.

By way of example, service provider system 104 may be configured to access from a database, customer parameters values for a first customer 114(1) associated with user device 102(1). Service provider system 104, may further apply a first machine learning algorithm to identify second customers 114(2) . . . 114(n) that have customer parameter values that correspond to the customer parameter values associated with first customer 114(1). The first machine learning algorithm may include a Gaussian Process Regression (GPR), however any other type of intelligence and machine learning model may be applied. Service provider system 104 further analyze customer profiles stored in database 106 and associated with the identified second customers 114(2) . . . 114(n). The analyzing includes determining types of redeemable reward categories that are utilized by the second customers included in the identified second customer profiles to generate a ranked list of redeemable reward categories. The types of redeemable reward categories may include, for example, travel rewards, gas rewards, cashback rewards and/or grocery rewards, gift card rewards, although any other type of reward category may also be included. The analyzing further ranks the reward categories based on determining a number of second customer profiles that are associated with each type of reward. The reward category type with the highest number of second customer profiles associated therewith is given the highest rank and the reward category type that has the lowest number of second customer profiles associated therewith is given the lowest rank. The resulting ranked list of redeemable reward categories is then transmitted as a first recommendation to user device 102(1) associated with the first customer 114(1). Service provider system 104 then receive from the first customer 114(1) a selection of selection of one or more reward categories from the ranked list of redeemable reward categories. Service provider system 104 then apply a second machine learning algorithm to determine personalized rewards for first customer 114(1) based on the selected redeemable reward categories and the customer parameters associated with first customer 114(1). The determined personalized rewards are then transmitted to user device 102(1) of first customer 114(1) for utilization.

In some embodiments, aspects of service provider system 104 may be configured to receive a request to initiate recommendation of personalized rewards from a user device 102(1). First customer 114(1) utilizes a user interface displayed on user device 102(1) to initiate the request for a recommendation of personalized rewards from service provider system 104.

A recommendation model, communicatively coupled to or included within service provider system 104, is constructed in advance using the customer specific information stored in database 106. System 100 may use one or more of a machine learning process or neural networks to construct the recommendation model to recommend one or more type of redeemable reward categories to customer 114(1) and to further recommend personalized rewards. System 100 may also have a machine learning algorithm incorporated such that the recommendation model may be updated each time customer 114(1) makes a purchase or financial transaction using a credit card provided by service provider system 104. The customer specific information is used to iteratively train and update the recommendation model to recommend the personalized rewards to first customer 114(1).

Database 106 of system 100 may be communicatively coupled to service provider system 104 and user devices 102(1)-102(n) via network 108. Database 106 may include one or more memory devices that store information and are accessed and/or managed by one or more components of system 100. By way of example, database 110 may include Oracle™ databases, Sybase™ databases, or other relational databases or nonrelational databases, such as Hadoop sequence files, HBase, or Cassandra. Database 106 may include computing components (e.g., database management system, database server, etc.) configured to receive and process requests for data stored in memory devices of database 106 and to provide data from database 106.

Database 106 is configured to store customer parameters values which include customer financial transaction values and/or customer demographic values. The customer financial transaction values include amounts of money spent by the customer for a time period, types of products purchased by the customer on a recurring basis, bank account statements, and/or customer credit card transactions, although any other type of transaction associated with the customer can also be included. The time period over which the amount of money spent by the customer may include 1 week, 1 month, 1 year and/or 1 day, however, any time period can be included. The customer demographic values include customer age, customer salary, customer location and/or customer marital status, although any other type of customer information can also be included. Database 106 also stores customer profiles associated with the customers 114(1)-114(n). The customer profiles include information about what type of redeemable reward categories are assigned to each of the customers 114(1)-114(n). The types of redeemable reward categories include travel reward, gas rewards, cashback rewards and/or grocery rewards, cash back rewards, although any other type of redeemable reward category may also be included.

In some embodiments, service provider system 104 updates customer profiles stored in database 106, by updating the type of redeemable reward categories associated with the customer profiles of customers 114(1)-114(n) based on tracking whether a customer has utilized rewards that were recommended by service provider system 104.

Service provider system 104 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. In providing, maintaining, managing or otherwise offering financial services, service provider system 104 may be enabled to authenticate financial transactions associated with financial service accounts of customers 114(1)-114(n).

In one aspect, service provider system 104 may include one or more computing devices, configured to perform one or more operations consistent with disclosed embodiments as described more fully below in relation to FIG. 3. In one aspect, service provider system 104 may include one or more servers or server systems. Service provider system 104 may include one or more processors configured to execute software instructions stored in a memory or other storage device. The one or more processors may be configured to execute the stored software instructions to perform internet-related communication, financial service-based processes, and machine learning for recommending redeemable reward categories and personalized rewards. The one or more computing devices of service provider system 104 may be configured to collect and store customer parameter values. The one or more computing devices of service provider system 104 may also be configured to communicate with other components of system 100 to recommend personalized rewards. In some embodiments, service provider system 104 may provide one or more mobile applications, web-sites or online portals that are accessible by user devices 102(1)-102(n) over network 108. The disclosed embodiments are not limited to any particular configuration of service provider system 104.

Service provider system 104 and user devices 102(1)-102(n) may be configured to communicate with each other over network 108. Network 108 may comprise any type of computer networking arrangement configured to provide communications or exchange data, or both, between components of system 100. For example, network 108 may include any type of network (including infrastructure) that provides communications, exchanges information, and/or facilitates the exchange of information, such as the Internet, a private data network, a virtual private network using a public network, a LAN or WAN network, a Wi-Fi™ network, and/or other suitable connections that may enable information exchange among various components of system 100. Network 108 may also include a public switched telephone network ("PSTN") and/or a wireless cellular network. Network 108 may be a secured network or unsecured network. In some embodiments, one or more components of system 100 may communicate directly through a dedicated communication link(s).

User devices 102(1)-102(n) may be one or more computing devices configured to perform one or more operations consistent with the disclosed embodiments, as described more fully below in relation to FIG. 2. User devices 102(1)-102(n) may execute browser or related mobile display software that displays redeemable reward category recommendations and personalized reward recommendations, on a display included in, or connected to, user devices 102(1)-102(n). User devices 102(1)-102(n) may also store and execute other mobile applications that allow customers 114(1)-114(n) to select a method by which customers 114(1)-114(n) wish to receive notifications from service provider system 104.

It is to be understood that the configuration of the functional blocks of system 100 has been defined herein for convenience of description. The components and arrangement of the components included in system 100 may vary. For example, in some embodiments, system 100 may include other components that perform or assist in the performance of one or more processes consistent with disclosed methods. System 100 includes a number of components generally described as computing devices. Each of the computing devices may include any number of computing components particularly configured as a special purpose computing device to perform the functionality disclosed herein. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
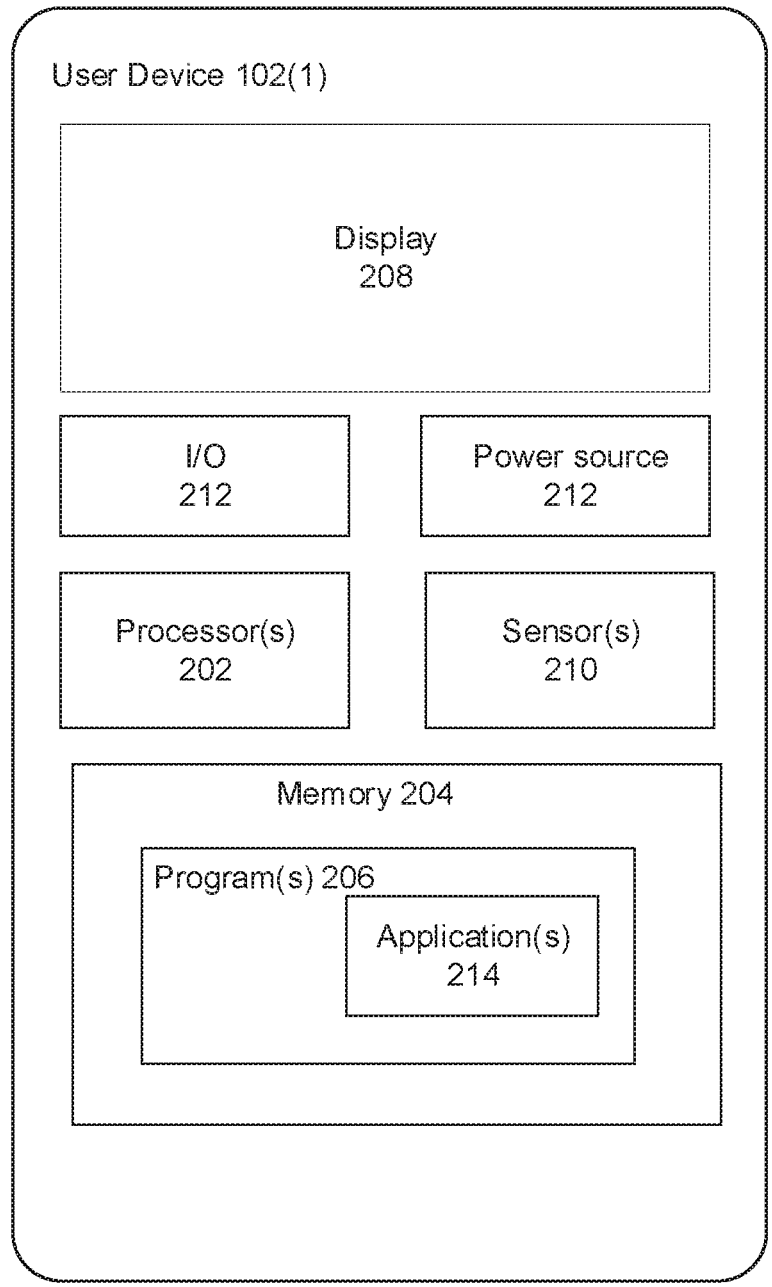
FIG. 2 is a block diagram of an exemplary user device, consistent with disclosed embodiments.

FIG. 2 shows an exemplary configuration of user devices 102(1), consistent with disclosed embodiments. User devices 102(2)-102(n) may be similarly configured. User device 102(1) may enable associated customer 114(1) to perform remote interactions or mobile transactions with service provider system 104, for example, or receive information from service provider system 104. In some embodiments, user device 102(1) may be a personal computing device. For example, user device 102(1) may be a smartphone, a laptop or notebook computer, a tablet, a multifunctional watch, a pair of multifunctional glasses, or any mobile or wearable device with computing ability, or any combination of these computers and/or affiliated components.

User device 102(1) includes one or more processors 202 configured to execute software instructions stored in memory, such as a memory 204. Memory 204 may store one or more software programs 206 that when executed by processor 202 perform known Internet-related communication, content display processes, and other interactive processes for customer 114(1). For instance, user device 102(1) may execute a browser or related mobile display software that generates and displays interfaces including content on a display device 208 included in, or in communication with, user device 102(1). User device 102(1) may be a mobile device that executes mobile device applications and/or mobile device communication software, included in programs 206, that allows user device 102(1) to communicate with service provider system 104 and other components via network 108, to generate and display content in interfaces via display device 208. The disclosed embodiments are not limited to any particular configuration of user device 102(1). User device 102(1) may include any arrangement of one or more computing devices configured to perform one or more operations consistent with disclosed embodiments.

User device 102(1) may be configured to store, in memory 204, one or more operating systems that perform known operating system functions when executed by processor 202. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 102(1) may also include communication software stored in memory 204 that, when executed by processor 202, provides communications with network 108, such as Web browser software, tablet or smart handheld device networking software, etc.

Display device 208 may include, for example, a liquid crystal displays (LCD), a light emitting diode screens (LED), an organic light emitting diode screen (OLED), a touch screen, and other known display devices. Display device 208 may display various information to customer 114(1). For example, display device 208 may display an interactive interface to customer 114(1) enabling customer 114(1) to operate user devices 102(1) to perform certain aspects of the disclosed methods. Display device 208 may display touchable or selectable options for customer 114(1) to select and may receive customer selection of options through a touch screen.

User device 102(1) includes I/O devices 212 that allow user devices 102(1)-102(n) to send and receive information or interact with customer 114(1) or another device. For example, I/O devices 212 may include various input/output devices, such as a keyboard, a mouse-type device, a gesture sensor, an action sensor, a physical button, switch, microphone, touchscreen panel, stylus, etc., that may be manipulated by customer 114(1) to input information using user devices 102(1). I/O devices 212 may also include an audio output device, such as a speaker configured to provide sound and audio feedback to customer 114(1) operating user device 102(1). In some embodiments, I/O devices 212 may include a light emitting component, such as an LED or other component capable of providing a visible signal to customer 114(1). I/O devices 212 may also include haptic output devices, to provide haptic feedback to customer 114(1). I/O devices 212 may also include one or more communication modules (not shown) for sending and receiving information from other components in system 100 by, for example, establishing wired or wireless connectivity between user device 102(1) and network 108. I/O devices 212 may include radio frequency, infrared, or other near-field communication interfaces, for communicating with other devices associated with network 108 or customer 114(1). Exemplary communication modules of I/O devices 212 may include, for example, a short-range or near field wireless communication modem, a Wi-Fi™ communication modem, or a cellular communication modem. I/O devices 212 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 102(1) to exchange information with service provider system 104 or database 106 via network 108.

As described above, user devices 102(1) may be a device that executes mobile applications for performing operations consistent with disclosed embodiments. Thus, in some embodiments, programs 206 stored on user devices 102(1) may include one or more software applications 214 installed thereon, that enable user devices 102(1)-102(n) to communicate with service provider system 104 via network 108 and perform aspects of the disclosed methods. For example, user device 102(1) may connect to service provider system 104 by using browser software to access and receive information or perform other operations associated with an internet service provider.

According to an exemplary embodiment, software applications 214 associated with service provider system 104 may be installed on user device 102(1), as shown in FIG. 2. For example, service provider system 104 may receive a request from user device 102(1) to download one or more software applications 214 to user device 102(1). In one embodiment, service provider system 104 may receive the request from customer 114(1), using a web browser application installed on user device 102(1) respectively. In another embodiment, service provider system 104 may receive the request to download one or more software applications 214 associated with service provider system 104 onto user device 102(1) from a webpage or another portal associated with service provider system 104 accessed by customer 114(1) via, e.g., user device 102(1). In this embodiment, service provider system 104 may store software instructions corresponding to one or more software applications 214 in database 106. For responding to the download request, service provider system 104 may receive additional information from user device 102(1) regarding the particular device specifications of user device 102(1) to enable user device 102(1) to download software instructions corresponding to the particular specifications. Alternatively, service provider system 104 may push a download request link to user device 102(1) or transmit software code corresponding to one or more software applications 214 directly to user device 102(1) in, for example, an e-mail, a text or short message service (SMS) message, a prompt through an app, or other suitable method. User device 102(1) may receive the software code related to one or more software applications 214, such as via network 108, to download and install the software code.

Figure 3:
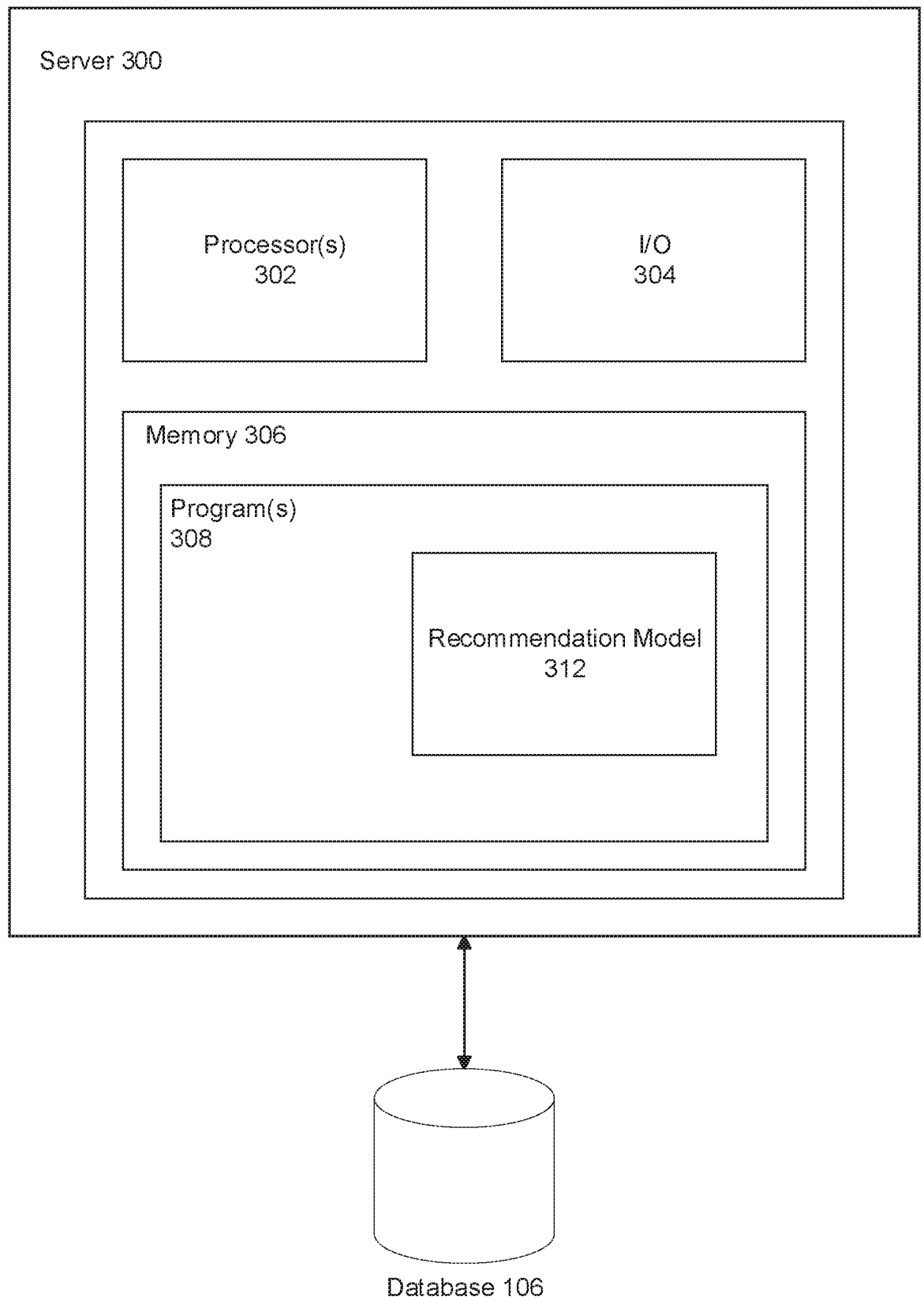
FIG. 3 is a block diagram of an exemplary server system, consistent with disclosed embodiments.

FIG. 3 shows an exemplary server 300 consistent with the disclosed embodiments. Variations of exemplary server 300 may constitute one or more components of service provider system 104. In one embodiment, server 300 includes one or more processors 302, one or more input/output (I/O) devices 304, and one or more memories 306. In some embodiments, server 300 may be a part of service provider system 104. In some embodiments, server 300 may take the form of a specially programmed server or computing system used by service provider system 104. In some embodiments, server 300 may be configured as an apparatus, embedded system, dedicated circuit, or the like based on the storage, execution, and/or implementation of software instructions that perform one or more operations consistent with the disclosed embodiments.

Processor 302 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100.

input/output (I/O) 304 may include various input/output devices, such as a keyboard, a mouse-type device, a gesture sensor, an action sensor, a physical button, switch, microphone, touchscreen panel, stylus, etc., that may be manipulated by customers 114(1)-114(n) to input information using user devices 102(1)-102(n). I/O devices 304 may also include an audio output device. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in server 300 to exchange information with service provider system 104, user devices 102(1)-102(n) or database 106 via network 108.

Memory 306 may include one or more storage devices configured to store instructions used by processor 302 to perform functions related to disclosed embodiments. For example, memory 306 may be configured with one or more software instructions, such as program(s) 308 that may perform one or more operations when executed by processor 302. The disclosed embodiments are not limited to separate programs or computers configured to perform dedicated tasks. For example, memory 306 may include a single program 308 that performs the functions of server 300, or program 308 may comprise multiple programs. In certain embodiments, memory 306 may store sets of instructions or programs 308 for determining a location of customer 114, accessing customer parameter values, analyzing customer profiles transmitting recommendations. These sets of instructions may be executed by processor 302 to perform communication and/or processes consistent with disclosed embodiments.

In certain embodiments, when server 300 constitutes one or more of the components of service provider system 104, memory 306 includes a recommendation model 312, corresponding to the above described recommendation model, which uses a first machine learning algorithm to identify a set of second customers 114(2) . . . 114(n) that have customer parameter values that correspond to the customer parameter values associated with first customer 114(1) and further to recommend redeemable reward categories and personalized rewards, as described in detail below. Recommendation model 312 may employ various machine learning algorithms including decision tree learning, association rule learning, artificial neural networks, inductive logic programming, support vector machines, clustering, Bayesian networking, reinforcement learning, representation learning, similarity and metric learning, spare dictionary learning, rule-based machine learning, etc. Recommendation model 312 may iteratively update its algorithm with customer specific information each time customers 114(1)-114(n) make a financial transaction, to increase its recommendation accuracy.

When service provider system 104 operates as server 300, the server 300 receives a request for initiating recommendation of personalized rewards from one of the user devices 102(1)-102(n). By way of example, the request for initiating recommendation of personalized rewards is received from user device 102(1) associated with first customer 114(1). First customer 114(1) may utilize a web browser or a mobile application installed on user device 102(1) to click on a button that generates a request to initiate recommendation of personalized rewards. The button may be associated with a prompt displayed next to the button [not shown in the drawings], that would read, for example, "Click the button to receive recommended redeemable reward categories based on other customers with similar lifestyle".

When server 300 receives the request from user device 102(1), server 300 accesses database 106 to collect customer parameter values associated with first customer 114(1). By way of example, the customer parameter values for first customer 114(1) include age of first customer 114(1), salary of first customer 114(1) and/or location of first customer 114(1), although any other type of customer parameter values may also be accessed.

Server 300 then collects corresponding customer parameter values associated with second customers 114(2)-114(n). By way of example, the customer parameter values collected for second customers 114(2)-114(n) includes age of customers 114(2)-114(n), salary of customers 114(2)-114(n), and/or location of customers 114(2)-114(n), although any other type of customer parameter values may also be accessed corresponding to that of first customer 114(1).

Further, server 300 applies the first machine learning algorithm to identify which of the customers among second customers 114(2)-114(n) have customer parameters values similar to those of first customer 114(1) by comparing the values associated with the customer parameters of first customer 114(1) and values associated with the customer parameters of second customers 114(2)-114(n). By way of example, when the age of first customer 114(1) is 30 years, the salary of the first customer 114(1) is $65,0000/year and/or the location of first customer 114(1) is New York City, then first machine learning algorithm compares the customer parameter values of first customer 114(1) with the customer parameters values of second customers 114(2)-114(n) to identify which of the customers among second customers 114(2)-114(n) meet the filtering criteria of age 30 years with a salary of $65,000 that live in New York City. In this example, the first machine learning algorithm identifies customers 114(2), 114 (3), and 114(4) as meeting the filtering criteria corresponding to first customer 114(1). Customers 114(2), 114 (3), and 114(4) are referred to as a set of filtered customers having customer parameter values that correspond to the customer parameter values of first customer 114(1).

Server 300 analyzes the customer profiles associated with the set of filtered customers 114(2) 114 (3), and 114(4) stored in database 106. Customer profiles includes rewards categories that are utilized by customers 114(2) 114(3) and 114(4) to accesses their rewards. In this example, the redeemable reward categories utilized and redeemed by customers 114(2), 114(3) and 114(4) are displayed in Table 1 of FIG. 7A.

In another embodiment, customer profiles include rewards categories that have been previously recommended to the customers 114(2) and 114(3).

The analyzing by server 300 also includes determining the type of redeemable reward categories that are utilized by the set of filtered customers included in their corresponding identified customer profiles to generate a ranked list of redeemable reward categories. FIG. 7B contains the list of redeemable reward categories, that are ranked based on determining the number of customers profiles that are associated with each type of redeemable reward categories. The redeemable reward category type with the highest number of customer profiles associated therewith is given the highest rank and the redeemable reward category type that has the lowest number of customer profiles associated therewith is given the lowest rank. For example, Table 2 in FIG. 7B shows as the Gas rewards category has a rank of "1" because it is included in all three customer profiles of customers 114(2), 114(3) and 114(4) (see Table 1) forming the set of filtered customers and has the highest number of second customer profiles associated with it. The Grocery rewards category is included in two of the customer profiles of customers 114(2) and 114(4), has the second highest number of second customer profiles associated with it, and is given a rank of 2. The Travel rewards and Gift Card rewards are both associated with one customer profile of customer 114(3) and customer 114(2) respectively. In this situation, the server 300 determine which of customers 114(2) and 114(3) have customer parameter values that most closely match the parameters values of customer 114(1). In this example, the age of customer 114(2) is 24 and the age of customer 114(3) is 35. As the age of customer 114(2) is closest to the age of customer 114(1) of 25, the redeemable reward category of Gift Card rewards associated with customer 114(2) is given a higher rank of rank 3 in comparison to the redeemable reward category of Travel rewards associated with customer 114(3) which is given a rank of 4. The cashback rewards are not included in any of the customer profiles of the customers 114(2), 114(3) and 114(4) and hence is given a rank of 5. Further, Table 2 shows a reward values column that is calculated by the server 300 based on the customer profiles. The reward values may include a discount of 50 c/per gallon as part of gas rewards category, a discount of 20% on grocery purchases as part of grocery rewards, a $50 gift card as part of gift card rewards category, receiving 50 miles on purchases of $1000 as part of travel rewards, and receiving 10% cashback on purchases as part of cashback rewards, although any other value of reward may be included. The reward values are stored in the customer profiles and further are updated to accrue the rewards over a timer period. The time period may include 1 week, 1 month and/or 1 year, although any other number of time period values may be included. The rewards continue to accumulate over the time period based on the customer purchases and customers may utilize the accumulated rewards as and when they prefer to.

Server 300 may generate a first recommendation based on the ranked list of redeemable reward categories of FIG. 7B. For example, server 300 may select the top 3 ranked redeemable reward categories from the ranked list of redeemable reward categories and transmit the top 3 ranked redeemable reward categories to user device 102(1) associated with first customer 114(1) as a first recommendation, although any number of redeemable reward categories from the ranked list of redeemable reward categories may be included in the first recommendation.

Upon receiving the first recommendation, first customer 114(1) selects one or more of the redeemable reward categories for which they would be interested in receiving the rewards, based on their preferences. Further, first customer 114(1) may also assign reward percentages to each of the categories to indicate how they would like to divide their total rewards. By way of example, first customer 114(1) may select Gas rewards and Grocery rewards as the only two rewards from the first recommendation for which they would like to receive their rewards. Further, first customer 114(1) may assign a 50% reward percentage for Gas rewards and 50% for Grocery rewards to equally divide the total reward being receiving. However, any number of redeemable reward categories may be selected from the first recommendation by first customer 114(1) and any number of percentages of be assigned to the selected redeemable reward categories by first customer 114(1).

Server 300 receives the selection of redeemable reward categories from the recommended list of categories from user device 102(1) of first customer 114(1).

Server 300 applies a second machine learning algorithm to determine personalized rewards associated with the selected redeemable reward categories for first customer 114(1). Server 300 analyzes the customer parameter values of first customer 114(1). For example, server 300 analyzes the bank account statements of first customer 114(1) and determines rewards collected and/or accrued by first customer 114(1) based on the amount money spent by first customer 114(1) for purchase transactions in the most recent billing period. Further, server 300 generates a personalized reward that includes division of reward percentages in the corresponding redeemable reward categories indicated by first customer 114(1).

Server 300 then transmits the personalized rewards to the first customer 114(1). In this example, the personalized reward includes 50% of reward percentage for Gas rewards and 50% for Grocery rewards. First customer 114(1) divides their rewards into multiple categories based on their own preferences of percentages, which results in the customer personalizing their type and amount of rewards they would receive in the first recommendation. This provides the advantages of determining an optimized reward that is of relevance to the customer. Further, providing rewards without taking into consideration a customer profile (e.g. lifestyle, demographics, purchase history) may cause significant disadvantages to the customer, such as, providing no motivation to the customer to utilize the credit card to make purchases or the customer may end up not utilizing their rewards, which may degrade the customer experience.

Server 300 then evaluates if first customer 114(1) has utilized the personalized rewards. By way of example, server 300 determines if the Gas rewards have been utilized for gasoline purchases and if the Grocery rewards have been utilized for grocery purchases. When it is determined that the rewards have been utilized, the first machine learning algorithm is updated. This updated first machine learning algorithm is then utilized for identifying second customers as described above. In some embodiments, recommendation model 312 may utilize machine learning to update and adjust its algorithm using the evaluation of utilization of the personalized rewards by the customers in real time.

Server 300 may also be communicatively coupled to one or more database(s) 106. In one aspect, server 300 may include database 106. Alternatively, database 106 may be located remotely from server 300 and server 300 may be communicatively coupled to database 106 through network 108.

In another embodiment, the first machine learning algorithm may utilize the customer parameter values of first customer 114(1) as filtering criteria by applying a range to each of the customer parameter values of second customers 114(2)-114(n) to identify which customers among second customers 114(2)-114(n) have customer parameters values similar to those of first customer 114(1). By way of example, the first machine learning algorithm may be preprogrammed to apply a range of 10 years for the customer parameter value of age, and a range of $10,000 for the customer parameter value of salary and a range of 100 miles for the customer parameters value of location. In this example, based on the age, salary, and location of first customer 114(1) being 30 years, $65,000/year and New York City, respectively, the first machine learning algorithm identifies customers that are in between the ages 25-35 years with a salary range of $60,0000-$70,000 and that live within 100 miles radius from New York City. Thus, for example, first machine learning algorithm identifies customers 114(3)-114(n) as meeting the ranges of filtering criteria.

Figure 4A:
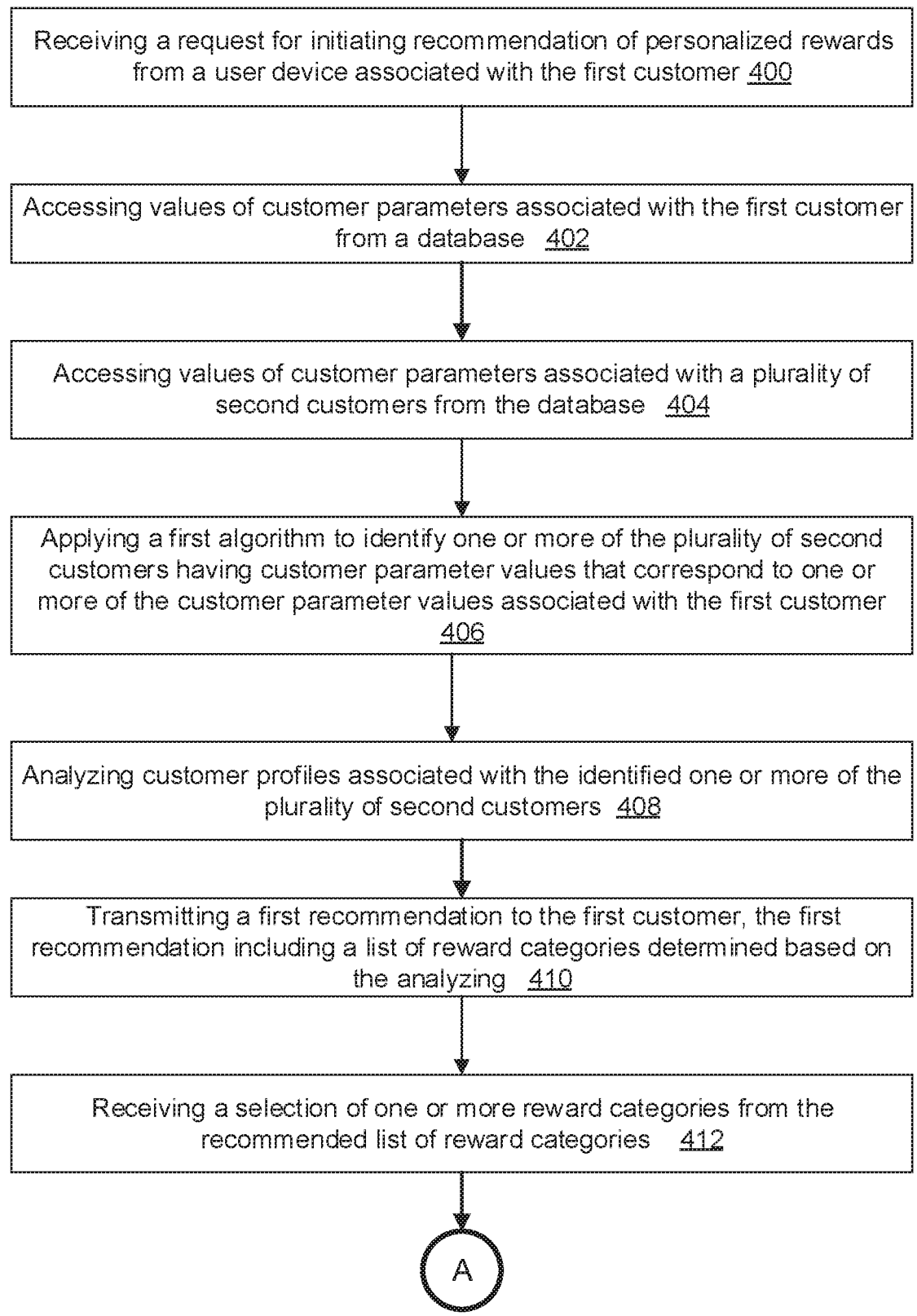
FIGS. 4A and 4B contain a flowchart of an exemplary process of recommending personalized rewards based on customer profiles and customer preferences by receiving redeemable reward categories selections and recommending rewards, consistent with disclosed embodiments.
Figure 4B:
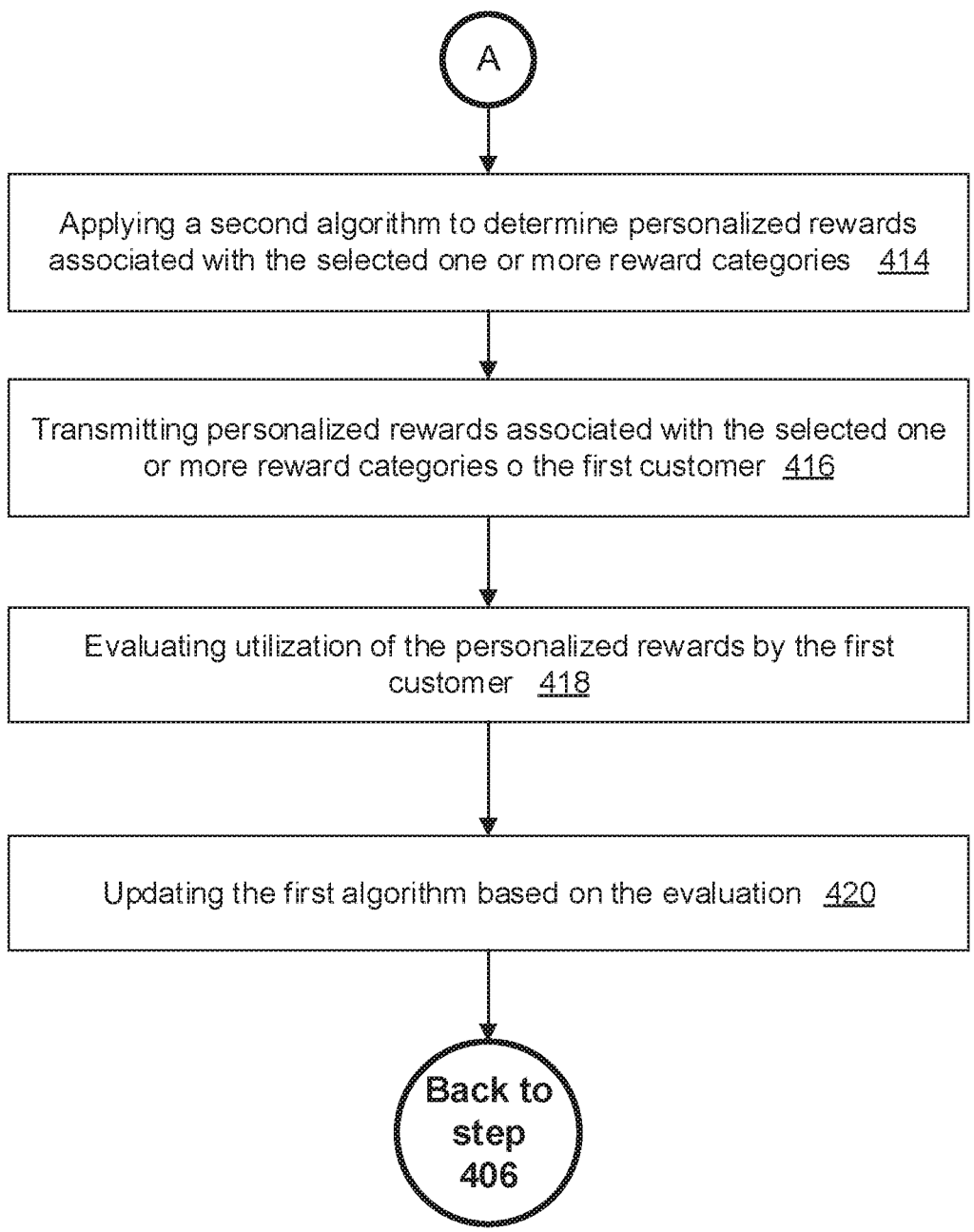

FIGS. 4A and 4B contain a flowchart of an exemplary process 400 to recommending personalized rewards based on customer profiles and customer preferences by receiving redeemable reward categories selections and recommending rewards, consistent with the disclosed embodiments. In certain aspects, service provider system 104 utilizes server 300 to execute software instructions that perform one or more of the operations of process 400.

In accordance with process 400, service provider system 104 receives a request for initiating recommendation of personalized rewards from one of a plurality of user devices 102(1)-102(n), in this example, the request is received from user device 102(1) associated with the first customer 114(1) (400). When the service provider system 104 receives the request from user device 102(1), service provider system 104 accesses database 106 to collect customer parameter values associated with first customer 114(1) (402). Service provider system 104 collects corresponding customer parameter values associated with a plurality of customers, e.g. see second customers 114(2)-114(n) (see FIG. 4A step 404). Service provider system 104 applies the first machine learning algorithm to identify which of the customers among second customers 114(2)-114(n) have customer parameters values similar to those of first customer 114(1) by comparing the values associated with the customer parameters of first customer 114(1) and values associated with the customer parameters of the second customers 114(2)-114(n) (see FIG. 4A step 406). By way of example, when the age of first customer 114(1) is 30 years, the salary of first customer 114(1) is $65,0000/year and/or the location of first customer 114(1) is New York City, then first machine learning algorithm compares these customer parameter values of first customer 114(1) with the customer parameters values of second customers 114(2)-114(n) to identify which of the second customers 114(2)-114(n) meet the filtering criteria of age 30 years with a salary of $65,000 and living in New York City. In this example, the first machine learning algorithm identifies customers 114(2) 114 (3), and 114(4) as meeting the filtering criteria corresponding to first customer 114(1). As noted above, customers 114(2) 114 (3), and 114(4) are referred to as filtered customers having customer parameter values that correspond to the customer parameter values of first customer 114(1).

As described the first machine learning algorithm, may utilize the customer parameter values of first customer 114(1) as filtering criteria by applying a range to each of the customer parameter values of second customers 114(2)-114(n) to identify which customers among second customers 114(2)-114(n) have customer parameters values similar to those of first customer 114(1). By way of example, the first machine learning algorithm may be preprogrammed to apply a range of 10 years for the customer parameter value of age, and a range of $10,000 for the customer parameter value of salary and a range of 100 miles for the customer parameters value of location. In this example, based on the age, salary, and location of first customer 114(1) being 30 years, $65,000/year and New York City, respectively, the first machine learning algorithm identifies customers that are in between the ages 25-35 years with a salary range of $60,0000-$70,000 and that live within 100 miles radius from New York City.

Service provider system 104 analyzes the customer profiles associated with filtered customers 114(2) 114 (3), and 114(4) stored in database 106 (see FIG. 4A step 408). In this example, the first machine learning algorithm identifies customers 114(2) 114 (3), and 114(4) as meeting the filtering criteria corresponding to first customer 114(1). The analyzing by service provider system 104 includes determining the type of redeemable reward categories that are utilized by the filtered customers included in the identified second customer profiles in order to generate a ranked list of redeemable reward categories, for example, as shown in FIG. 7B. The list of redeemable reward categories are ranked based on determining the number of second customer profiles that are associated with each type of redeemable reward category. The redeemable reward category type with the highest number of second customer profiles associated with it is given the highest rank and the redeemable reward category type that has the lowest number of second customer profiles associated with it is given the lowest rank. For example, FIG. 7B shows as the Gas rewards category is included in all three customer profiles of customers 114(2), 114(3) and 114(4) and has the highest number of second customer profiles associated with it, it is given a rank of 1. The Grocery rewards category is included in two of the customer profiles of customers 114(2) and 114(4), has the second highest number of second customer profiles associated with it, and is given a rank of 2. The Travel rewards and Gift Card rewards are respectively associated with the customer profiles of customer 114(3) and customer 114(2). In this situation, the server 300 determine which of customers 114(2) and 114(3) have customer parameter values most closely that match those of first customer 114(1). In this example, the age of customer 114(2) is 24 and the age of customer 114(3) is 35. As the age of customer 114(2) is closest to the age of customer 114(1) of 25, the redeemable reward category of Gift Card rewards associated with customer 114(2) is given a higher rank of rank 3 in comparison to the redeemable reward category of Travel rewards associated with customer 114(3) which is given a rank of 4. The Cashback reward is not included in any of the customer profiles of customers 114(2), 114(3) and 114(4) and hence is given a rank of 5.

Service provider system 104 generates a first recommendation based on the ranked list of redeemable reward categories as, for example, of FIG. 7B. Show in Service provider system 104 may select the top 3 ranked redeemable reward categories from the ranked list of redeemable reward categories and transmits the top 3 ranked redeemable reward categories to user device 102(1) associated with first customer 114(1) as a first recommendation (see FIG. 4A step 410), although any number of redeemable reward categories from the ranked list of redeemable reward categories may be included in the first recommendation.

Upon receiving the first recommendation, first customer 114(1) selects one or more of the redeemable reward categories for which they would be interested in receiving the rewards based on their preferences. Service provider system 104 receives the selection of redeemable reward categories from the recommended list of categories from user device 102(1) of first customer 114(1) (see FIG. 4A step 412). Service provider system 104 applies a second machine learning algorithm to determine personalized rewards associated with the selected redeemable reward categories for the first customer 114(1) (414). Service provider system 104 analyzes the customer parameter values of first customer 114(1). For example, server 300 service provider system 104 analyzes bank account statements of first customer 114(1) and determines rewards collected and/or accrued by first customer 114(1) based on the amount money spent by first customer 114(1) for purchase transactions in the most recent billing period. Further, service provider system 104 generates a personalized reward that includes division of reward percentages among the corresponding redeemable reward categories selected indicated by first customer 114(1). Service provider system 104 then transmits the personalized rewards to the first customer 114(1) (See FIG. 4B step 416). In this example, the personalized reward includes 50% of reward percentage for gas rewards and 50% for Grocery rewards (416). After a pre-defined time period, service provider system 104 then evaluates if first customer 114(1) has utilized already accrued personalized rewards (See FIG. 4B step 418). The time period may include 1 hour, 1 day, 1 week, or 1 month, although any other time period may also be included.). By way of example, server 300 determines if the Gas rewards have been utilized for gasoline purchases and if the Grocery rewards have been utilized for grocery purchases. When it is determined that the rewards have been utilized, the first machine learning algorithm is updated. This updated first machine learning algorithm is then utilized for identifying second customers as described above in step 406 (420). In some embodiments, recommendation model 312 may utilize machine learning to update and adjust its algorithm using the evaluation of utilization of the personalized rewards by the customers in real-time.

Figure 5A:
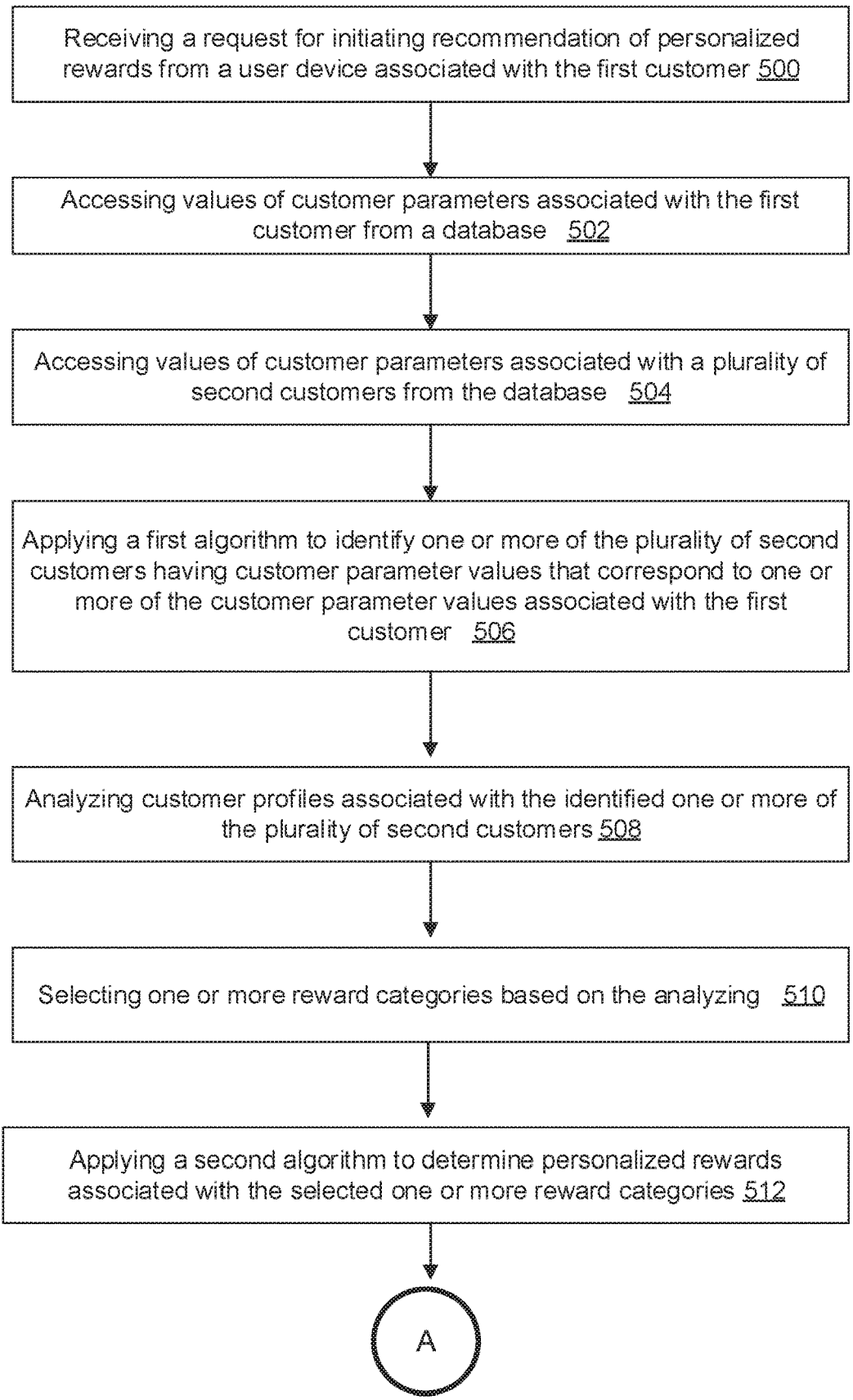
FIGS. 5A and 5B contain a flowchart of an exemplary process of recommending personalized rewards based on customer profiles and customer preferences by automatically selecting redeemable reward categories and recommending rewards, consistent with disclosed embodiments.
Figure 5B:
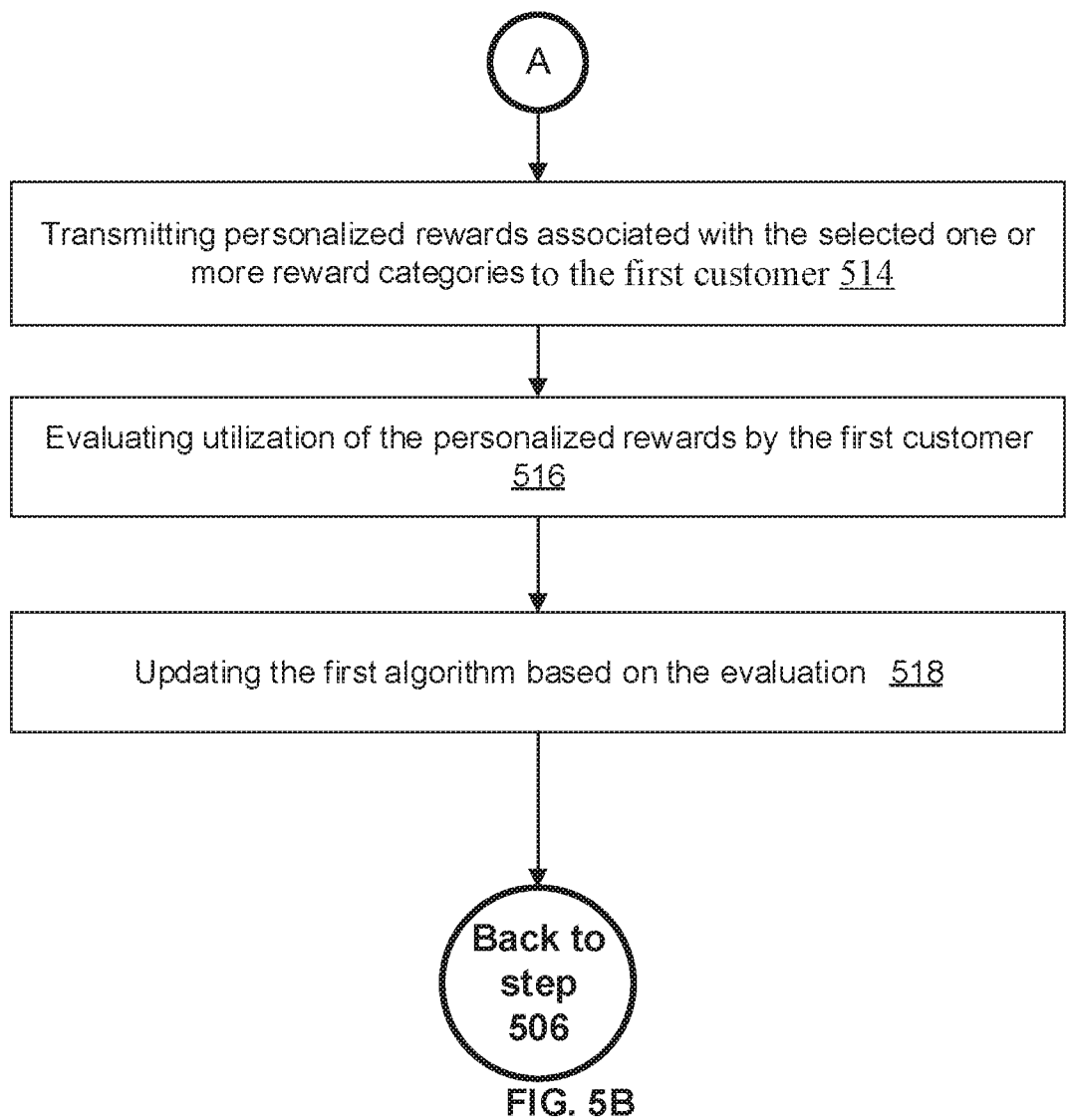

FIGS. 5A and 5B contain a flowchart of an exemplary process 500 for recommending personalized rewards based on customer profiles and customer preferences by automatically selecting redeemable reward categories and recommending rewards, consistent with the disclosed embodiments. In certain aspects, service provider system 104 utilizes server 300 to execute software instructions that perform one or more of the operations of process 500.

In accordance with process 500, service provider system 104 receives a request for initiating recommendation of personalized rewards from one of a plurality of user devices 102(1)-102(n), in this example, the request is received from user device 102(1) associated with first customer 114(1) (500). When service provider system 104 receives the request from user device 102(1), service provider system 104 accesses database 106 to collect customer parameter values associated with first customer 114(1) (502). The service provider system 104 collects corresponding customer parameter values associated with second customers 114(2)-114(n) (504). Service provider system 104 applies the first machine learning algorithm to identify which of customers among second customers 114(2)-114(n) have customer parameters values similar to those of first customer 114(1) by comparing the values associated with the customer parameters of first customer 114(1) and values associated with the customer parameters of the second customers 114(2)-114(n) (506). This step is substantially the same as described above for step 406 of process 400.

The service provider system 104 analyzes the customer profiles associated with second customers 114(2) 114 (3), and 114(4) stored in database 106 (508). In this example, the first machine learning algorithm identifies customers 114(2) 114 (3), and 114(4) as meeting the filtering criteria corresponding to first customer 114(1). Step 508 is substantially the same as described above for step 408 of process 400.

Service provider system 104 selects the top 3 redeemable ranked reward categories from the ranked list of redeemable reward categories (510), although any number of ranked redeemable reward categories can be selected. Service provider system 104 applies a second machine learning algorithm to determine personalized rewards associated with the selected redeemable reward categories for first customer 114(1) (512). Step 512 is substantially the same as described above for step 414 in process 400. Service provider system 104 then transmits the personalized rewards to the first customer 114(1) (514), in a manner substantially the same as described above for step 415 in process 400 Service provider system 104 then evaluates if first customer 114(1) has utilized the personalized rewards (516) in a manner substantially the same as described above for step 418 in process 400.. When it is determined that the rewards have been utilized the resulting in the first machine learning algorithm is being updated. This updated first machine learning algorithm is then utilized for identifying second customers as described above in step 506 (518). In some embodiments, recommendation model 312 may utilize the machine learning to update and adjust its algorithm using the evaluation of utilization of the personalized rewards by the customers in real-time.

Figure 6:
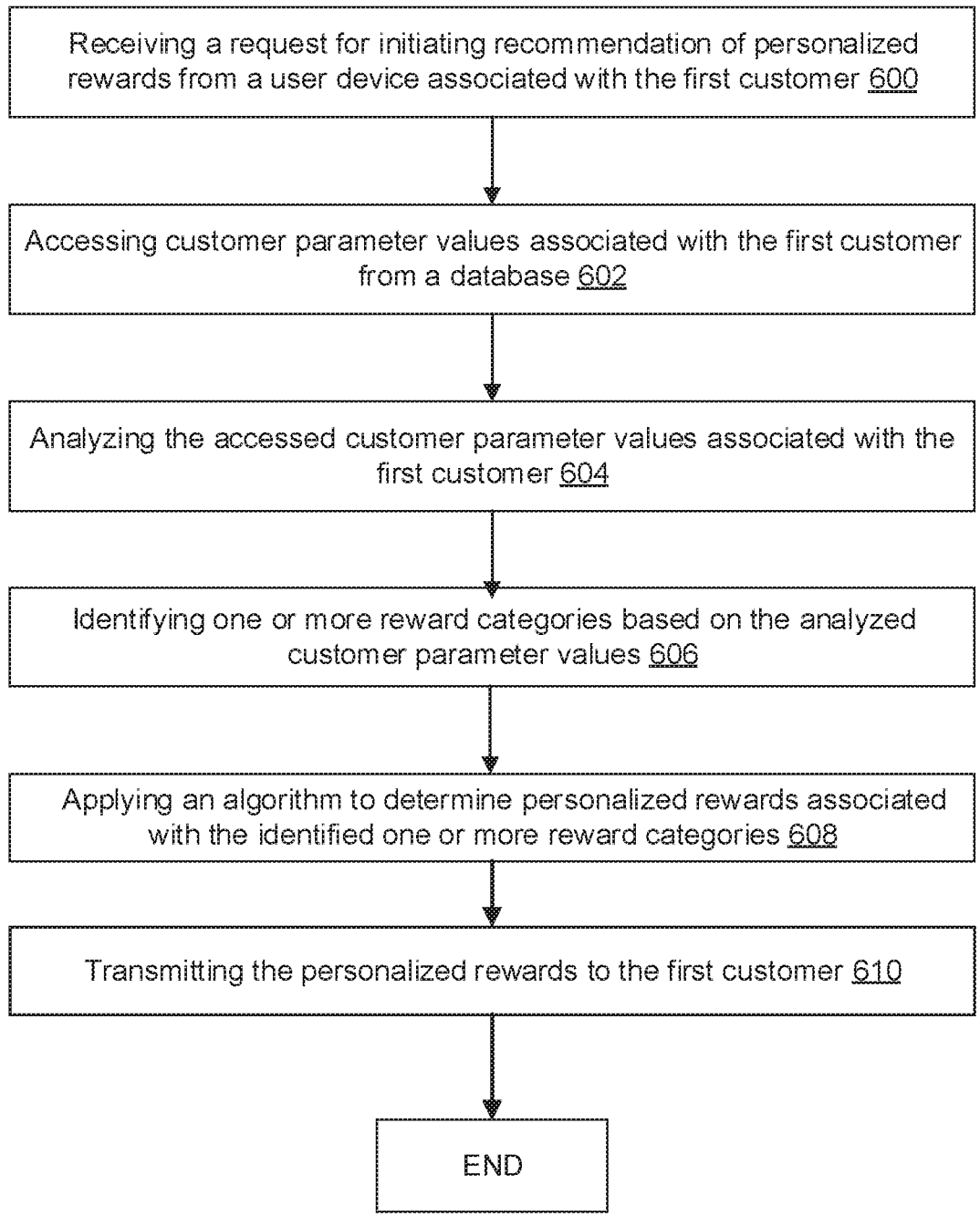
FIG. 6 contains a flowchart of an exemplary process of recommending personalized rewards based on customer profiles and customer preferences by automatically recommending rewards, consistent with disclosed embodiments.

FIG. 6 is a flowchart of an exemplary process 600 for recommending personalized rewards based on customer profiles and customer preferences by automatically recommending rewards, consistent with the disclosed embodiments. In certain aspects, service provider 104 utilizes server 300 to execute software instructions that perform one or more of the operations of process 600.

In accordance with process 600, service provider system 104 receives a request for initiating recommendation of personalized rewards from one of a plurality of user devices 102(1)-102(n), in this example, the request is received from user device 102(1) associated with first customer 114(1) (600). When service provider system 104 receives the request from user device 102(1), service provider system 104 accesses database 106 to collect customer parameter values associated with first customer 114(1) (602). Service provider system 104 analyzes the accessed customer parameter values associated with first customer 114(1) (604). By way of example, the customer parameter values include financial transactions of the customer, credit card transactions, types of products purchase and/or types of stores where purchases are made by first customer 114(1) on a recurring basis. Service provider system 104 identifies one or more reward categories based on analyzing the customer parameter values (606). For example, based on analyzing the credit card transactions by service provider system 104 it is determined that first customer 114(1) has, for example, made 20 transactions related to purchasing travel tickets in the last month and thus first customer 114(1) has a lifestyle of travelling. Accordingly, service provider system 104 identifies the travel rewards category as a category of interest for first customer 114(1). Further, based on analyzing the credit card transactions, service provider system 104 determines that first customer 114(1) has made frequent purchases at a store "Whole Foods" or "Costco". Accordingly, service provider system 104 determines that first customer 114(1) has a lifestyle of grocery shopping and thus the grocery rewards category is identified as a category of interest for first customer 114(1).

Service provider system 104 applies a machine learning algorithm to determine personalized rewards associated with the identified redeemable reward categories for first customer 114(1) (608). Service provider system 104 analyzes the customer parameter values of first customer 114(1). For example, service provider system 104 analyzes the bank account statements of first customer 114(1) and determines rewards collected and/or accrued by first customer 114(1) based on the amount money spent by first customer 114(1) for purchase transactions in the most recent billing period. Further, service provider system 104 generates a personalized reward that includes division of reward percentages in the corresponding redeemable reward categories that have been previously defined by the first customer 114(1). Service provider system 104 then transmits the personalized rewards to first customer 114(1). In this example, the personalized reward includes 50% of reward percentage for travel rewards and 50% for Grocery rewards (610).

The disclosed embodiments provide an improved method of transmitting a first recommendation including reward categories that are relevant to first customer 114(1) and, based on customer preferences, further transmitting a second recommendation including personalized rewards associated with reward categories that are selected by first customer 114(1). By identifying and transmitting relevant reward categories to first customer 114(1) based on customer parameters associated with second customers 114(2)-114(n), the disclosed embodiments provide improved recommendations that give first customer 114(1) advantages by taking into consideration types of reward categories utilized by second customers that have a similar lifestyle. Further, the disclosed embodiments provide customers with options to personalize the rewards earned by selecting multiple reward categories based on the customer's own preferences. This further encourages customers to spend more and utilize the rewards that they earn more frequently.

In contrast, in the prior art, other strategies that have been implemented are inconsistent and not customizable, which may not be beneficial to customers, and further the prior art does not take into consideration lifestyle of customers, and further also does not provide customers with recommendations of reward categories or selection of multiple of reward categories to efficiently utilize rewards.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The elements in the claims are to be interpreted broadly based on the language employed in the claims and not limited to examples described in the present specification or during the prosecution of the application, which examples are to be construed as non-exclusive. It is intended, therefore, that the specification and examples be considered as exemplary only, with a true scope and spirit being indicated by the following claims and their full scope of equivalents.

The invention claimed is:

1. A system for recommending personalized rewards based on customer profiles and customer preferences using machine learning models, the system comprising:
   one or more memory devices storing instructions; and
   one or more processors configured to execute the instructions to:
      receive from a user device associated with a first customer, a request for initiating recommendation of personalized rewards;
      access values of one or more customer parameters associated with the first customer from a database;
      determine a range of values corresponding to each of the one or more customer parameters associated with the first customer;
      access values of the one or more customers parameters associated with a plurality of second customers from the database;
      compare, using a first machine learning model, the range of values corresponding to each of the one or more customer parameters of the first customer with the values of the one or more customer parameters of the plurality of second customers to identify one or more of the plurality of second customers having customer parameter values that correspond to one or more of the customer parameter values associated with the first customer;
      analyze, using a second machine learning model, customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions;
      transmit a first recommendation to the user device associated with the first customer, the first recommendation comprising the list of reward purchase categories determined based on the analyzing;
      receive a selection by the first customer of one or more reward categories from the recommended list of reward categories;
      dynamically select a second recommendation, the second recommendation comprising personalized rewards associated with the selected one or more reward categories, the personalized rewards to accrue based on consumer purchase transactions by the first customer; and;
      transmit the second recommendation to the user device associated with the first customer.

2. The system of claim 1, wherein the one or more customer parameters include a customer age, a customer income, a customer location, a customer spending trend, or a customer credit score.

3. The system of claim 1, wherein the list of reward categories include gas rewards, travel rewards, grocery rewards, casino rewards, hotel stay rewards, restaurant deals, or movie ticket rewards.

4. The system of claim 1, the one or more processors being further configured to execute instructions to:
   evaluate the utilization of the recommended rewards associated with the selected one or more reward categories; and
   update an algorithm based on the evaluation.

5. The system of claim 1, the one or more processors being further configured to execute instructions to:
   select the one or more reward categories based on the customer profiles associated with the identified one or more of the second customers; and
   recommend rewards associated with the dynamically selected one or more reward categories.

6. The system of claim 3, the one or more processors being further configured to execute instructions to:
   select the one or more reward categories based on a customer profile associated with the first customer; and
   recommend rewards associated with the dynamically selected one or more reward categories.

7. The system of claim 4, wherein the algorithm includes a machine learning algorithm.

8. The system of claim 1, the one or more processors being further configured to execute instructions to:
   determine the personalized rewards based on maximum savings that the first customer would receive on gas purchases, grocery shopping, or travel tickets.

9. A computer implemented method for recommending personalized rewards based on customer profiles and customer preferences using machine learning models, the method comprising:
   receiving, from a user device associated with a first customer, a request for initiating recommendation of personalized rewards;
   accessing values of one or more customer parameters associated with the first customer from a database;
   accessing values of the one or more customer parameters associated with a plurality of second customers from the database;
   determining a range of values corresponding to each of the one or more customer parameters associated with the first customer;
   comparing, using a first machine learning model, the range of values corresponding to each of the one or more customer parameters of the first customer with the values of the one or more customer parameters of the plurality of second customers to identify one or more of the plurality of second customers having customer parameter values that correspond to one or more of the customer parameter values associated with the first customer;
   analyzing, using a second machine learning model, customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions;
   transmitting a first recommendation to the user device associated with the first customer, the first recommendation comprising the list of reward purchase categories determined based on the analyzing;
   receiving a selection by the first customer of one or more reward categories from the recommended list of reward categories;

dynamically selecting a second recommendation, the second recommendation comprising personalized rewards associated with the selected one or more reward categories, the personalized rewards to accrue based on consumer purchase transactions by the first customer; and transmitting the second recommendation to the user device associated with the first customer.

10. The method of claim 9, wherein the one or more customer parameters include a customer age, a customer income, a customer location, a customer spending trend, or a customer credit score.

11. The method of claim 9, wherein the list of reward categories include gas rewards, travel rewards, grocery rewards, casino rewards, hotel stay rewards, restaurant deals, or movie ticket rewards.

12. The method of claim 9, further comprising:
evaluate the utilization of the recommended rewards associated with the selected one or more reward categories; and
update an algorithm based on the evaluation.

13. The method of claim 9, further comprising:
select the one or more reward categories based on the customer profiles associated with the identified one or more of the second customers; and
recommend rewards associated with the dynamically selected one or more reward categories.

14. The method of claim 11, further comprising:
select the one or more reward categories based on a customer profile associated with the first customer; and
recommend rewards associated with the dynamically selected one or more reward categories.

15. The method of claim 12, wherein the algorithm includes a machine learning algorithm.

16. The method of claim 9 further comprising:
determine the personalized rewards based on maximum savings that the first customer would receive on gas purchases, grocery shopping or travel tickets.

17. A non-transitory computer-readable medium storing instructions executable by one or more processors to perform operations for recommending personalized rewards based on customer profiles and customer preferences using machine learning models, the operations comprising:
receiving, from a user device associated with a first customer, a request for initiating recommendation of personalized rewards;
accessing values of one or more customer parameters associated with the first customer from a database;
determining a range of values corresponding to each of the one or more customer parameters associated with the first customer;
accessing values of the one or more customer parameters associated with a plurality of second customers from the database;
comparing, using a first machine learning model, the range of values corresponding to each of the one or more customer parameters of the first customer with the values of the one or more customer parameters of the plurality of second customers to identify one or more of the plurality of second customers having customer parameter values that correspond to one or more of the customer parameter values associated with the first customer;
analyzing, using a second machine learning model, customer profiles associated with the identified one or more of the second customers to determine a list of redeemable reward categories, wherein the customer profiles comprise historical purchase transaction information associated with the identified one or more of the second customers and wherein the redeemable reward categories comprise rewards that are redeemable for consumer purchase transactions;
transmitting a first recommendation to the user device associated with the first customer, the first recommendation comprising the list of reward purchase categories determined based on the analyzing;
receiving a selection by the first customer of one or more reward categories from the recommended list of reward categories;
dynamically selecting a second recommendation, the second recommendation comprising personalized rewards associated with the selected one or more reward categories, the personalized rewards to accrue based on consumer purchase transactions by the first customer; and
transmitting the second recommendation to the user device associated with the first customer.

18. The non-transitory computer-readable medium of claim 17, wherein the one or more customer parameters include a customer age, a customer income, a customer location, a customer spending trend, or a customer credit score.

19. The non-transitory computer-readable medium of claim 17, wherein the list of reward categories include gas rewards, travel rewards, grocery rewards, casino rewards, hotel stay rewards, restaurant deals, or movie ticket rewards.

20. The non-transitory computer-readable medium of claim 17, the operations further comprising:
evaluating the utilization of the recommended rewards associated with the selected one or more reward categories; and
updating an algorithm based on the evaluation.

* * * * *